April 13, 1937. H. D. RANDALL 2,077,264

WEATHER STRIP OR SEALING MEANS

Filed Sept. 24, 1934

Inventor

Howard D. Randall

By Murray & Zugelter

Attorneys

Patented Apr. 13, 1937

2,077,264

UNITED STATES PATENT OFFICE 2,077,264

WEATHER STRIP OR SEALING MEANS

Howard D. Randall, Cincinnati, Ohio

Application September 24, 1934, Serial No. 745,304

6 Claims. (Cl. 154—2)

This invention relates to a weather stripping or sealing means, and a method of manufacture therefor.

An object of the invention is to provide a weather strip which is applied by means of a continuous fastening means, such as an adhesive coating carried by the back of the strip.

Another object of the invention is to provide a weather strip or sealing element having a peculiar shape which affords a lightly contacting but tight sealing structure at the joints between movable members, such as windows or doors and their frames, and other closures.

Another object of the invention is to provide an article of the character stated, which is long-lived, easily applied, and inexpensively manufactured.

A further object of the invention is to provide a simple, inexpensive and effective method of manufacturing the article above referred to.

These and other objects are attained by the means described herein and disclosed in the accompanying drawing, in which.

Figure 1:
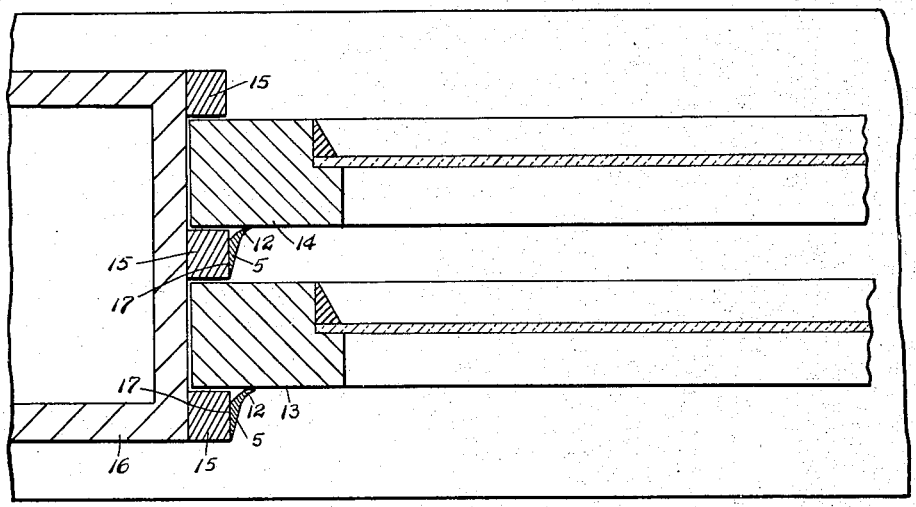
Fig. 1 is a fragmental cross-sectional view of a sliding window structure with the weather strip or sealing strip of the invention applied thereto.
Figure 3:
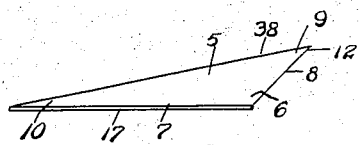
Fig. 3 is an enlarged end view of the completed weather strip or sealing element of the invention.

Referring to the accompanying drawing, 5 indicates the weather strip or sealing strip which is the subject of the present invention. The strip preferably is fabricated of felt, rubber or other flexible and resilient material which may be considered suitable. As shown in Fig. 3, the strip is substantially triangular of cross section, the angle 6 which is opposite to the hypotenuse being obtuse and the legs 7 and 8 which include said angle being disposed angularly to the hypotenuse to include the acute angles 9 and 10. In the preferred form of the invention, the leg 7 is longer than the leg 8, and the longer leg carries a coating of adhesive which preferably is water-proof and capable of being softened or rendered tacky by the application of a suitable solvent. That portion of the material which forms the angle 9 provides a flexible, tapered, over-hanging projection 12, which is adapted for substantial line-contacting abutment with a surface such as 13, which surface is movable relative to the sealing strip. The over-hanging projection 12 is adapted to flex in the manner indicated in Fig. 1, wherein 13 and 14 indicate window sashes which are movable between the usual guide strips 15 of a window frame 16.

The character 17 indicates any suitable adhesive which is applied to the material defined by the longer leg 7, which is the base of the sealing strip. The exact composition of the adhesive is not important to the invention, however, it may be stated that the adhesive may comprise mixtures of gum, gutta-percha, rubber, cellulosic material, or the like, which may be softened and rendered tacky by the application of suitable solvents such as carbon tetrachloride, alcohol, acetone or the like. The adhesive is applied only to the base 7 of the strip, and does not extend to the flexible, tapered projection 12. When it is desired to apply the weather strip or sealing strip 5, it is necessary only to apply solvent to the adhesive coating 17 and thereafter mount the strip upon window guides such as 15, or upon a face 18 of a door or other closure means.

Figure 4:
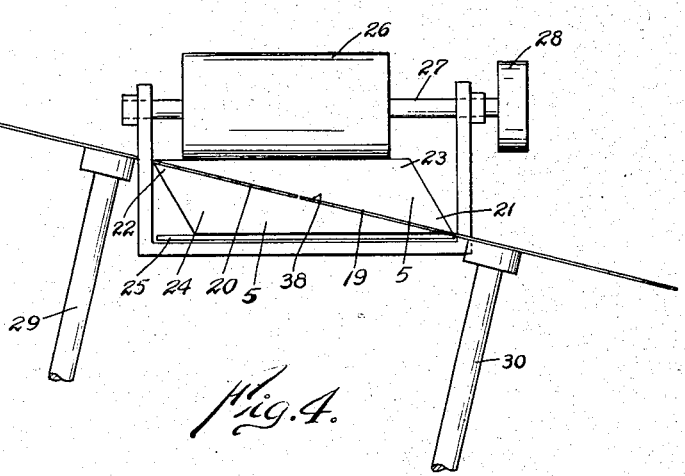
Fig. 4 is an end view of a slitting machine that may be employed in practicing the method of manufacture of the strip shown in Fig. 3.

In manufacturing the weather strip or sealing strip of this invention, a single length of resilient felt, rubber or the like is conveyed or fed to a pair of slitter knives 19 and 20, in the manner illustrated in Fig. 4. Said length of material initially is parallelogrammic in cross section, with opposed acute angles 21 and 22 and opposed obtuse angles 23 and 24. The material is fed in any suitable manner such as by means of a moving conveyor belt to the angularly disposed slitter elements 19 and 20, which perform the slitting operation in a plane which passes through the opposed, acute angles 21 and 22 of the parallelogrammic form. The device of Fig. 4 may include also a feed-controlling means or roller 26 which determines the rate of linear travel of the strips past the slitter or cutting means. The roller may be mounted upon a shaft 27 with a pulley or the like 28 adapted to be driven at a pre-determined rate of rotation so as to control the movement of the strip through the slitting means. Although other forms of slitting means may be employed, there is illustrated one form only, which comprises sharpened discs 19 and 20 mounted upon rapidly rotating shafts 29 and 30 which are supported for rotation at a proper angle to slit the strip in the desired manner aforesaid. By means of the foregoing apparatus, the method is performed so as to fabricate two complete weather or sealing strips at one slitting operation. It is to be understood that the adhesive coating above referred to may be applied to opposite faces of the strip either before or after the slitting operation.

Figure 2:
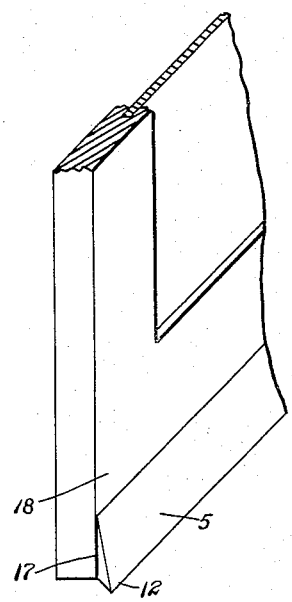
Fig. 2 is a fragmental perspective view showing the article of the invention applied to one edge of a hinged window or door.

It will be noted that in applying the finished weather strip or sealing strip to a window frame or to a door or the like as indicated in Fig. 2, the adhesive will have no opportunity to reach the window sash or the door sill due to the fact that the portion 12 of the sealing strip overhangs the adhesive coating base to such an extent that smearing or displacement of the adhesive on to the sash or sill is practically impossible. The feathered edge formed at the intersection of the shorter leg 8 and the hypotenuse 38 is resilient and flexible so that it may assume the position indicated in Fig. 1, thereby to form a line contact with the sash or sill without such strong force as would induce scratching of the sash or sill surfaces and premature wearing of the sealing edge. The use of a water-proof solvent-softened adhesive insures a tight joint, or one which constitutes a continuous fastening means. The peculiar shape of the finished article affords a lightly contacting and tight sealing structure which is long-lived when applied and inexpensively manufactured.

The device of the invention is not limited to application to windows or doors, nor does the apparatus of Fig. 4 represent a finished and fully developed machine for practicing the process used in manufacturing the strip of the invention. Therefore, it is to be understood that various modifications and changes in the structural details characterizing the invention may be made within the scope of the appended claims without departing from the spirit of the invention.

What is claimed is:

1. The method of manufacturing a sealing strip having a base to be attached to a surface and a resilient tapered projection overhanging the base, said method comprising forming a length of resilient material to render its cross-section parallelogrammic with opposed acute angles and opposed obtuse angles, then splitting said strip longitudinally in a plane which passes through the opposed acute angles of the parallelogrammic form.

2. The method of manufacturing a sealing strip having an adhesive coated base to be attached to a surface and a resilient tapered projection overhanging the base, said method comprising forming a length of resilient material to render its cross-section parallelogrammic with opposed acute angles and opposed obtuse angles, and thereafter moving said length of material progressively relative to a cutting means for splitting said material along a plane which passes through the opposed acute angles of the parallelogrammic form, then applying an adhesive to a face which provides the base of the strip.

3. The method of manufacturing a sealing strip which method comprises preforming a length of resilient material to render its cross-section parallelogrammic with opposed acute angles and opposed obtuse angles, then moving said length of material progressively relative to a cutting means for splitting the material along a plane which passes through the opposed acute angles of the parallelogrammic form.

4. The method of manufacturing a plurality of completed sealing strips in one operation, which method comprises applying a coating of water-proof solvent-softened adhesive to opposite faces of a length of rubber, which length of rubber is first made parallelogrammic of cross-section, and thereafter moving said length of rubber progressively relative to a cutting means for splitting said length of rubber along a plane which passes substantially through two opposite angles of the parallelogrammic form, to provide two completed sealing strips.

5. The method of manufacturing a weather strip having an adhesive coated base for attachment of the strip to a surface, said method comprising subjecting a length of resilient material to an adhesive coating treatment, to coat that face of the strip which will provide the weather strip base, said length of material being initially parallelogrammic of cross-section, then moving said length of material progressively relative to a cutting means for slitting said length of material along a plane which passes substantially through two opposed angles of the parallelogrammic form.

6. The method of manufacturing a weather strip having a base portion adhesively coated for attachment thereof to a surface, said method comprising forming a length of resilient material to render it parallelogrammic of cross section, moving said length of material progressively relative to a cutting means for splitting said length of material along a plane which passes substantially through two opposite angles of the parallelogrammic form, then applying an adhesive to a face which provides the base of the weather strip.

HOWARD D. RANDALL.